United States Patent
Di Federico

(10) Patent No.: US 7,911,881 B2
(45) Date of Patent: Mar. 22, 2011

(54) METHOD AND APPARATUS FOR ULTRASONIC SENSING

(75) Inventor: Ivan Di Federico, Argenta (IT)

(73) Assignee: TSD Integrated Controls, LLC, Livermore, CA (US)

( * ) Notice: Subject to any disclaimer, the term of this patent is extended or adjusted under 35 U.S.C. 154(b) by 400 days.

(21) Appl. No.: 12/012,650

(22) Filed: Feb. 5, 2008

(65) Prior Publication Data

US 2008/0259730 A1    Oct. 23, 2008

Related U.S. Application Data

(60) Provisional application No. 60/925,506, filed on Apr. 20, 2007.

(51) Int. Cl.
  *G01B 17/00*   (2006.01)
(52) U.S. Cl. ......................................................... 367/99
(58) Field of Classification Search .................. 367/99, 367/902, 96; 374/100, 141, 142; 600/549
  See application file for complete search history.

(56) References Cited

U.S. PATENT DOCUMENTS

| | | | |
|---|---|---|---|
| 5,201,604 A | | 4/1993 | Ferguson et al. |
| 5,301,170 A | | 4/1994 | James |
| 5,632,555 A | * | 5/1997 | Gregory et al. ............... 374/102 |
| 5,702,201 A | | 12/1997 | Macku et al. |
| 5,870,351 A | * | 2/1999 | Ladabaum et al. ........... 367/163 |
| 5,984,420 A | | 11/1999 | Murray et al. |
| 6,074,090 A | | 6/2000 | Chen |
| D570,715 S | * | 6/2008 | Di Federico ................... D10/70 |
| 2004/0111034 A1 | * | 6/2004 | Lin et al. ........................ 600/549 |
| 2005/0052950 A1 | * | 3/2005 | Klinnert et al. .................. 367/99 |
| 2006/0045620 A1 | | 3/2006 | Olson et al. |
| 2008/0191054 A1 | * | 8/2008 | Di Federico et al. ........... 239/69 |
| 2008/0259730 A1 | * | 10/2008 | Di Federico ................... 367/118 |

FOREIGN PATENT DOCUMENTS

| | | |
|---|---|---|
| DE | 3413391 A | 10/1985 |
| DE | 8806271 U1 | 8/1988 |
| DE | 8814419 | 1/1989 |
| WO | WO/2008/130586 | * 10/2008 |

OTHER PUBLICATIONS

Friedrichs; Machine translation of DE3413391, (which originally published on Oct. 24, 1985); one page.*
"New BOMAG 815-2 Commercial Paver Offers Mainline Paver Features", downloaded from http://ww.forester.net/gx_news?020806_bomag.html on Jan. 31, 2008.

(Continued)

*Primary Examiner* — Dan Pihulic
(74) *Attorney, Agent, or Firm* — Wolff & Samson, PC

(57) ABSTRACT

A distance and temperature sensing unit is used on paving vehicles. The unit has a first set of range sensors of a first diameter and a second set of range sensors of a second diameter. The unit calculates a weighted average distance to a road surface based on ranges measured by the multiple sensors. The unit also has a temperature sensor on a temperature bar. The bar is affixed to the unit by a flexible connection preventing break-off when the bar encounters obstacles, like the road surface, while the paving vehicle is moving.

21 Claims, 6 Drawing Sheets

OTHER PUBLICATIONS

"New Vogele Mobile Feeder Akkows Non-Stop Paving", downloaded from http://www.projectsmonitor.com/detailnews.asp?newsid=7671secid=80 on Jan. 31, 2008.

"Thermo Ramsey Grad-Line Asphault Paving Controls", downloaded from http://www.aysuyp.com/ramsey/productPDF_25917.pdf on Jan. 31, 2008.

International Search Report corresponding to International Application No. PCT/US2008/004940 filed Apr. 16, 2008 (6 pages).

Written Opinion of the International Searching Authority corresponding to International Application No. PCT/US2008/004940 filed Apr. 16, 2008 (9 pages).

* cited by examiner

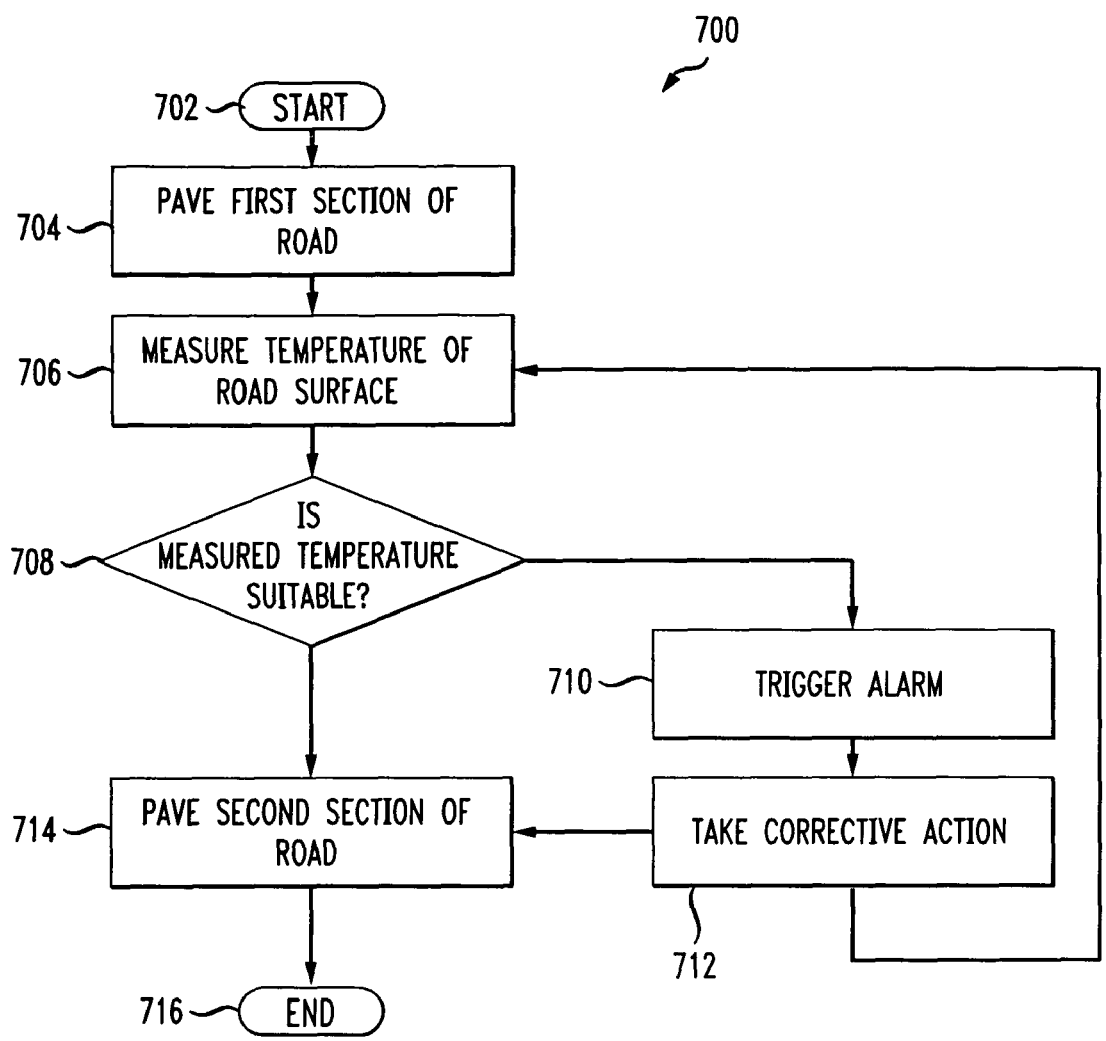

METHOD AND APPARATUS FOR ULTRASONIC SENSING

This application claims the benefit of U.S. Provisional Application No. 60/925,506 filed Apr. 20, 2007 which is incorporated herein by reference.

BACKGROUND OF THE INVENTION

The present invention relates generally to range sensing and more particularly to ultrasonic range sensing and temperature sensing in road finishing applications. In construction using asphalt and concrete materials (e.g., road finishing, paving, etc.) various systems and methods for sensing the distance to a surface (e.g., a road) have been used.

Contacting and non-contacting systems have been used. Contacting systems suffer in that they are prone to damage and breakage. Prior non-contacting systems are not accurate enough. These systems generally employ a range sensor, such as an ultrasonic sensor, to measure the distance from the construction vehicle or sensing unit to the road surface. In some systems more than one homogenous sensor is used to measure distances to the surface from the sensing unit. These measured distances are averaged to determine an approximate distance between the sensing mechanism and the surface.

In some cases, these sensing units or construction vehicles include some apparatus for temperature sensing. An example of a commonly used temperature sensor is a U-shaped metal attachment to the sensing apparatus that extends toward the road surface. The attachment is used to measure the temperature at the road surface.

The prior range sensing set-ups often provide inaccurate measurements and/or inconsistent sensing because the construction vehicle and/or the sensors and sensing unit may be too close or too far away from the road surface. That is, the sensors may not be in their optimal performance range. Accordingly, improved systems and methods for range sensing are needed.

BRIEF SUMMARY OF THE INVENTION

The present invention generally provides methods and apparatus for range and temperature sensing. A range sensing apparatus for determining a distance from the range sensing apparatus to a surface has at least one ultrasonic range sensor having a first size (e.g., diameter) and at least one ultrasonic range sensor having a second size (e.g., diameter). The range sensing apparatus also has a controller configured to calculate a distance to the surface based at least in part on distances measured by the range sensors. In at least one embodiment, the controller calculates the calculated distance by weighting the measured distances based on a predetermined distance to the surface and calculating a weighted average of the first and second sets of measured distances.

In one embodiment of the invention, a range sensing apparatus has a housing, a flexible connection attached to the housing, a bar attached to the flexible connection, and a temperature sensor attached to the bar. In this embodiment, the controller is configured to receive temperature information from the temperature sensor.

These and other advantages of the invention will be apparent to those of ordinary skill in the art by reference to the following detailed description and the accompanying drawings.

BRIEF DESCRIPTION OF THE DRAWINGS

FIG. 7 illustrates a method of paving according to an embodiment of the invention.

DETAILED DESCRIPTION

The present invention generally provides systems and methods for improved range sensing in a construction environment. More specifically, the present invention provides more accurate distance determination. This may be achieved using multiple sensors of multiple sizes in a single sensing unit, infrared temperature sensing, and/or a foldable temperature bar.

In an embodiment of the invention, multiple sensors of varying sizes (e.g., diameters) on a sensing unit are used to determine an approximate distance from the sensing unit to a reference point (e.g., from a range sensor to a surface). The present invention employs sensors of different sizes and diameters in order to more accurately determine the distance between the sensing mechanism and the intended point or surface of measurement. In such an embodiment, these sensors are used to determine most accurately this distance through the means of ultrasonic emission and reception whereby each sensor has a unique weighting or influence on a determined distance. That is, a mathematical calculation may be performed which more heavily regards (e.g., weights, assigns a multiplier to, etc.) distances measured by one set of sensors. These sensors are configured in a single housing or component piece, so as to enable more accurate determination of the distance to be measured.

In the same and/or alternative embodiments of the invention, various temperature sensing apparatus (e.g., temperature sensors) are included at (e.g., integrated into and/or coupled to) the sensing unit. These temperature sensors establish a reference for use in determining (e.g., calculating) a distance to the road surface. Ideally, air temperature between the temperature sensor and the surface should be known because uncompensated variations in air temperature may compromise the accuracy of the range measurements. The temperature sensor may help compensate (e.g., aid in accounting, calculating, and/or adjusting) for variations in air temperature. While an appropriate compensation factor may be more easily determined when the air temperature is relatively constant between the sensor and surface and is only disturbed by temporary air turbulence, the inventive system may account for more significant fluctuations in temperature and conditions. Additionally and/or alternatively, one or more temperature sensors are used to determine the temperature of the work surface to determine if appropriate working conditions exist.

Figure 1A:
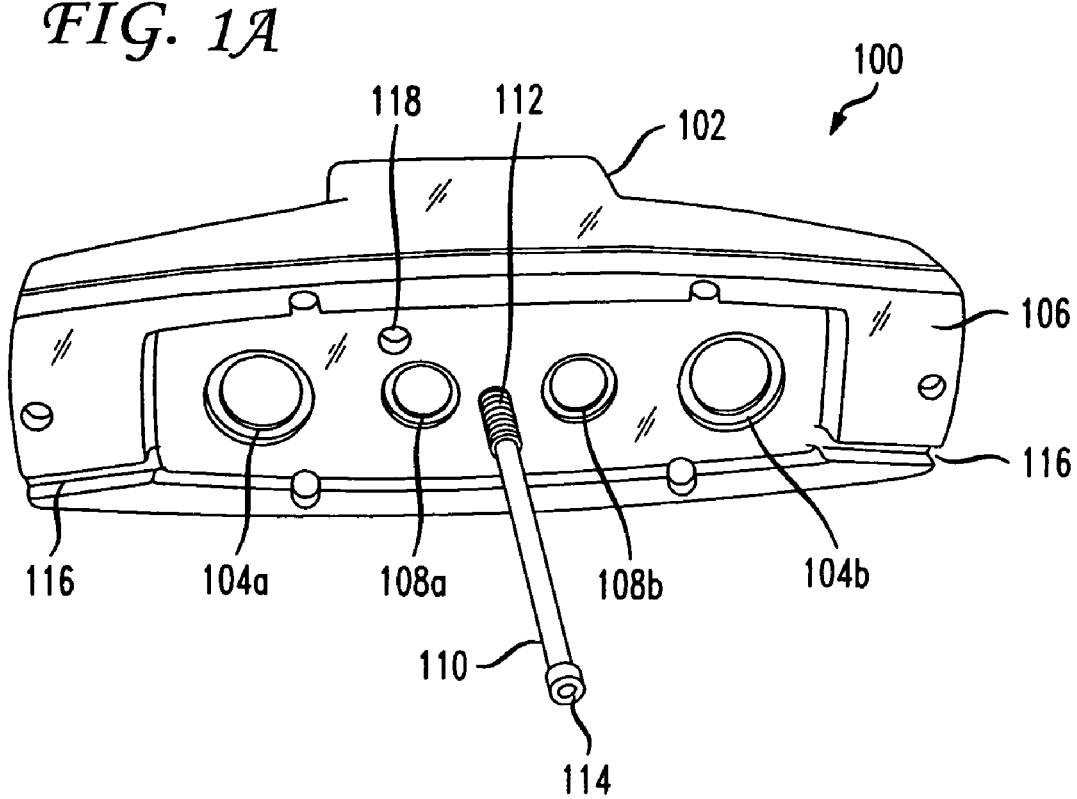
FIG. 1A depicts a bottom-side perspective view of a sensing unit according to an embodiment of the present invention.
Figure 1B:
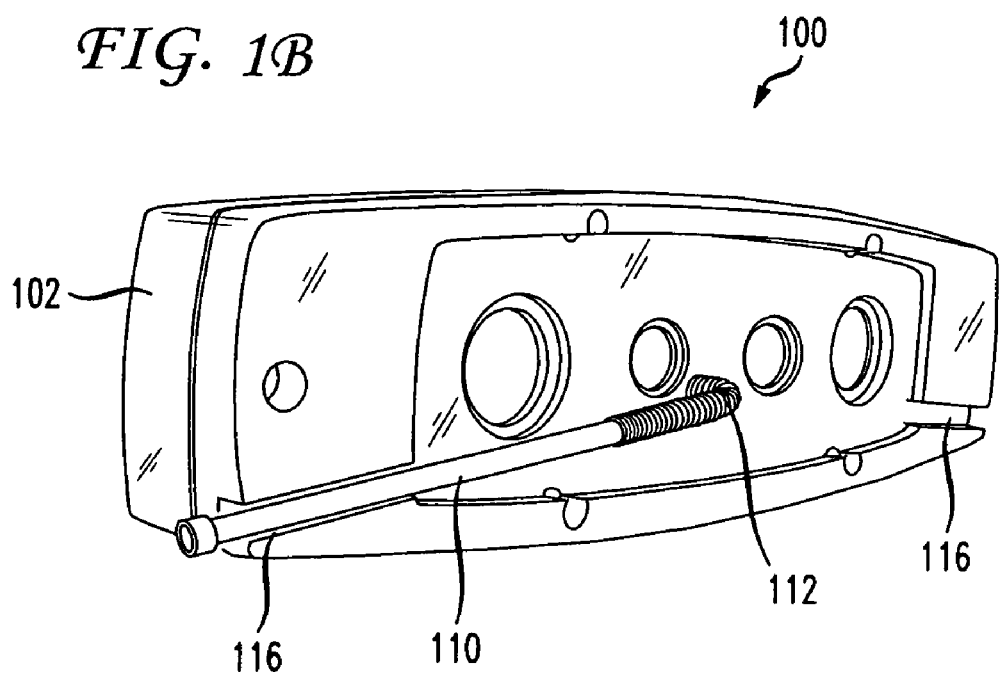
FIG. 1B depicts a bottom perspective view of a sensing unit according to an embodiment of the present invention.

FIGS. 1A and 1B depict an exemplary sensing unit 100 according to an embodiment of the present invention. FIG. 1A shows a bottom-side perspective view of the sensing unit 100 and FIG. 1B shows a bottom perspective view of the sensing unit 100. The sensing unit 100 comprises a housing 102, which encloses a controller 400 (not shown in FIGS. 1A and 1B, but discussed below with respect to FIG. 4) for controlling the various components and functions of the sensing unit 100.

Sensing unit 100 includes one or more outer sensors 104a and 104b. In the exemplary embodiment of FIGS. 1A and 1B, the sensing unit 100 has two outer sensors 104a and 104b located on a bottom surface 106 of the sensing unit 100. It may be understood that, in some embodiments, other numbers of outer sensors 104 may be used. Also located on the bottom surface 106 are one or more inner sensors 108a and 108b. Similar to outer sensors 104a and 104b, any number of inner sensors 108 may be used. Of course, subsequent sensors, rows of sensors, or arrangements of sensors may be used such as a set of inner-inner sensors (e.g., sensors arranged inboard of the inner sensors 108a and 108b) or arranging the sensors in a substantially circular pattern or sets of concentric circles, for example. Generally, outer sensors 104a and 104b are located outboard (e.g., closer to an end or edge of sensing unit 100) of inner sensors 108a and 108b. In alternative embodiments, inner sensors 108a and 108b may be located outboard of outer sensors 104a and 104b and/or adjacent outer sensors 104a and 104b. As will be discussed further below with respect to FIG. 3, outer sensors 104a and 104b and inner sensors 108a and 108b may be spaced apart a predetermined distance from each other and/or from a point on or section of sensing unit 100 and may be of varying diameters and/or sizes which may be correlated to each other. Though depicted as residing on/within bottom surface 106, outer sensors 104a and 104b and inner sensors 108a and 108b may be located in any other appropriate location on the sensing unit 100 (e.g., on an end, on top, projecting from a surface, etc.).

Sensing unit 100 may also include one or more temperature sensing devices. In the embodiment depicted in FIGS. 1A and 1B, the temperature sensing device may be a temperature bar 110 protruding from the bottom surface 106. The temperature bar 110 may be coupled (e.g., attached) to the sensing unit 100 via a flexible or otherwise moveable, rotatable, and/or detachable connection 112 at its proximal end and may include a temperature detector 114 at its distal end. As shown in FIG. 1B, a portion on or near the distal end of temperature bar 110 may be securable to the housing 102 at one or more catches 116 when the temperature bar 110 and/or the temperature detector 114 is not in use, when the sensing unit 100 is being transported, etc. Temperature bar 110 may additionally or alternatively be secured to the housing 102 at other locations along its length using other catches or any other appropriate securing means. Other temperature sensing means such as temperature sensor 118 may also be included.

Figure 6:
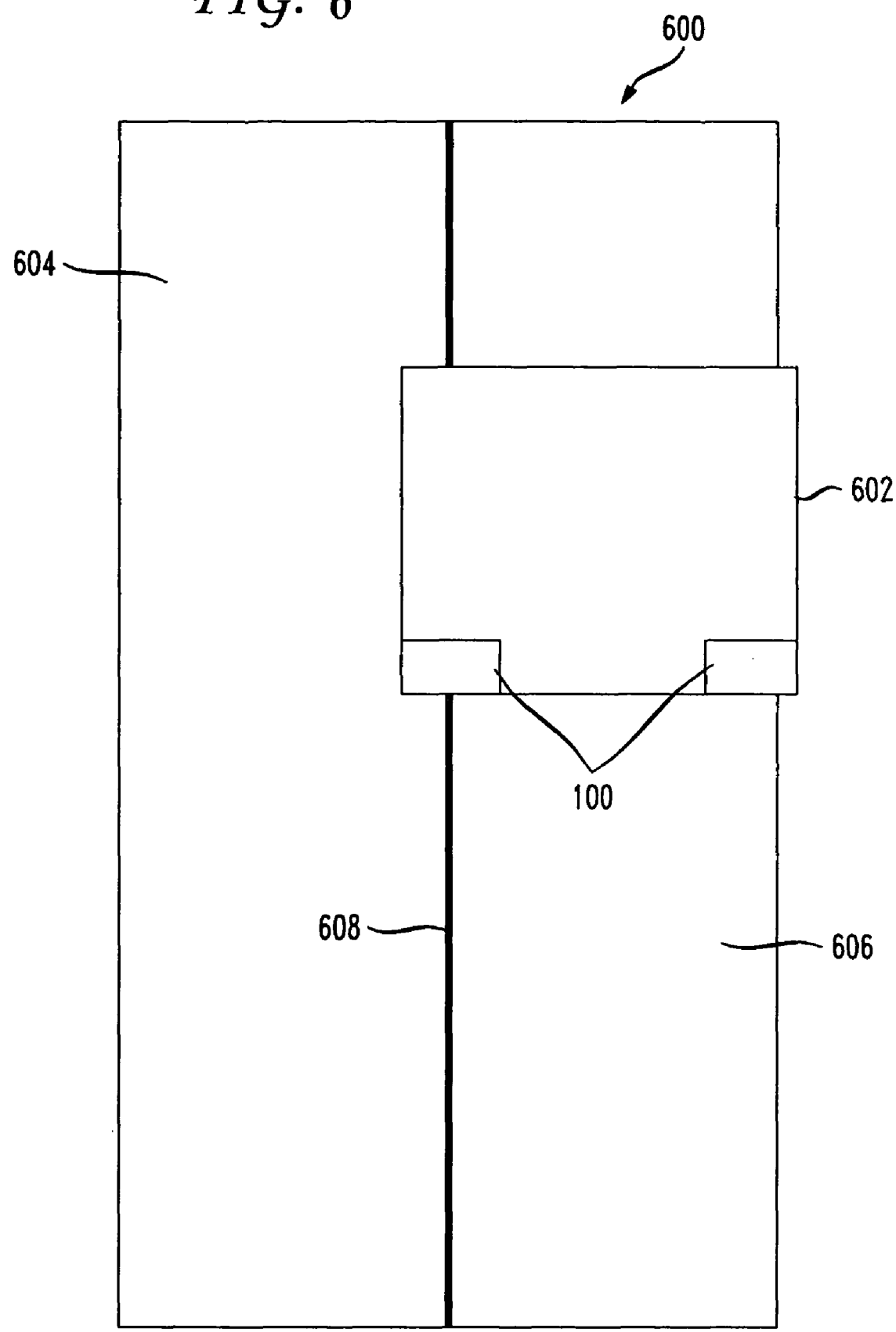
FIG. 6 depicts a paving system according to an embodiment of the present invention.

Sensing unit 100 may be a stand-alone unit and/or may be included as part of a construction system (e.g., attached to a paving vehicle 602 of FIG. 6). In some embodiments, the sensing unit 100 may be coupled to the paving vehicle 602 (FIG. 6) such that it is capable of feeding back information such as temperature and/or range information. Such information may be recorded (e.g., with control circuitry of controller 400), displayed to one or more users, or otherwise catalogued so as to provide information in real-time and/or in a memory to one or more users. That is, the sensing unit 100 may record and/or send temperature and/or range information to a paving vehicle operator for use during construction operations. Similarly, one or more parts (e.g., components) of the sensing unit 100 may provide distance and/or temperature information to an automated system (e.g., in conjunction with a system such as paving system 600 of FIG. 6). Additionally, sensing unit 100 may be removable, angleable, and/or otherwise positionable to provide the most accurate temperature and range information possible.

Outer sensors 104a and 104b and inner sensors 108a and 108b may be ultrasonic sensors as are known. Other types of sensors may be used as appropriate such as highly collimated light beam (e.g., laser) sensors, optical sensors, interferometers, etc. Outer sensors 104a and 104b and inner sensors 108a and 108b may be controlled via control circuitry of the sensing unit 100 (e.g., controller 400), by an external source, or by any other appropriate method. Outer sensors 104a and 104b and inner sensors 108a and 108b may be configured to measure a respective distance from the sensor to a surface and/or object. That is, outer sensors 104a and 104b and inner sensors 108a and 108b are used to measure a distance from the sensing unit 100 to a surface.

Temperature bar 110 may be a rod, shaped wire, substantially U-shaped bar, support means, etc. of any appropriate length secured to the sensing unit 100 via a flexible connection 112 or secured directly to the sensing unit 100. Flexible connection 112 may be a spring, hinge, pivot, or other flexible apparatus to secure temperature bar 110 to the housing 102, but also to allow temperature bar 110 to be moved. In some cases, temperature bar 110 may be moved manually (e.g., secured by a user to catch 116). In other cases, temperature bar 110 may be moved in response to an obstacle. That is, in the course of operation, the temperature bar 110 and/or temperature detector 114 may contact an obstacle (e.g., a road surface, rock, debris, etc.) and the flexible connection 112 may allow the temperature bar 110 to move (e.g., swing and/or bend) out of the way of the obstacle without breaking off as in prior rigid extended temperature sensors. In some embodiments, temperature bar 110 may itself be flexible such that it is capable of bending, flexing, and/or moving as when encountering an obstacle or acted upon (e.g., pushed) by an outside force.

Temperature-detector 114 may be a temperature sensor. Similarly, temperature bar 110 may be a temperature sensor and/or may be adapted to transmit temperature information from the temperature detector 114 to a controller 400 of FIG. 4 or other appropriate location as discussed above. In operation, the temperature detector 114 (or the temperature bar 110 if no temperature detector 114 is used) may measure a temperature near a surface and/or may measure one or more temperatures of air between the sensing unit 100 and a surface.

Temperature sensor 118 may be an infrared sensor capable of measuring a temperature at and/or near to a surface and transmitting the temperature information to the sensing unit 100 and/or another appropriate location. Similar to temperature detector 114 and temperature bar 110, temperature sensor 118 may also be capable of measuring one or more temperatures of air between the sensing unit 100 and a surface. In some embodiments, the temperature sensor 118 may be capable of triggering an alarm condition when a detected temperature is outside of a predetermined temperature range. That is, temperature sensor 118 (or similarly temperature bar 110 and/or temperature detector 114) may be configured to transmit temperature information to controller 400. The temperature information may be used to indicate (e.g., by controller 400) an alert condition (e.g., surface too hot, a temperature difference between the sensing unit 100 and the work surface, etc.). Temperature sensor 118 may also be any other appropriate type of sensor.

In some embodiments, temperatures determined using temperature bar 110 and/or temperature detector 114 (e.g., a temperature of air between sensing unit 100 and a surface)

and temperatures determined using temperature sensor 118 (e.g., a temperature at or near to the surface) may be used in combination to estimate a curve of air temperatures between the sensing unit 100 and the surface. For example, sensing unit 100 and/or controller 400 of FIG. 4 may utilize one or more temperatures determined using temperature bar 110, temperature detector 114, and/or temperature sensor 118 to approximate a distribution of the actual air temperatures between the sensing unit 100 and the surface.

Figure 2A:
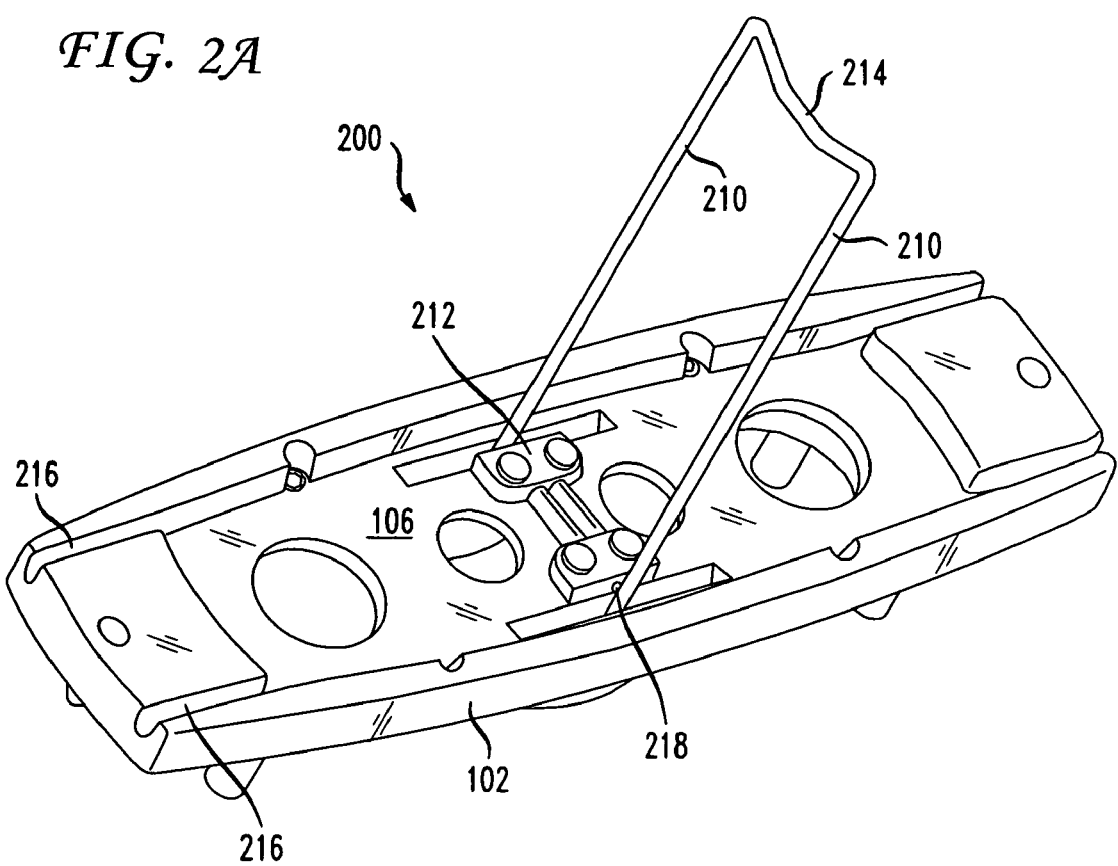
FIG. 2A depicts a bottom perspective view of an alternative sensing unit according to an embodiment of the present invention.
Figure 2B:
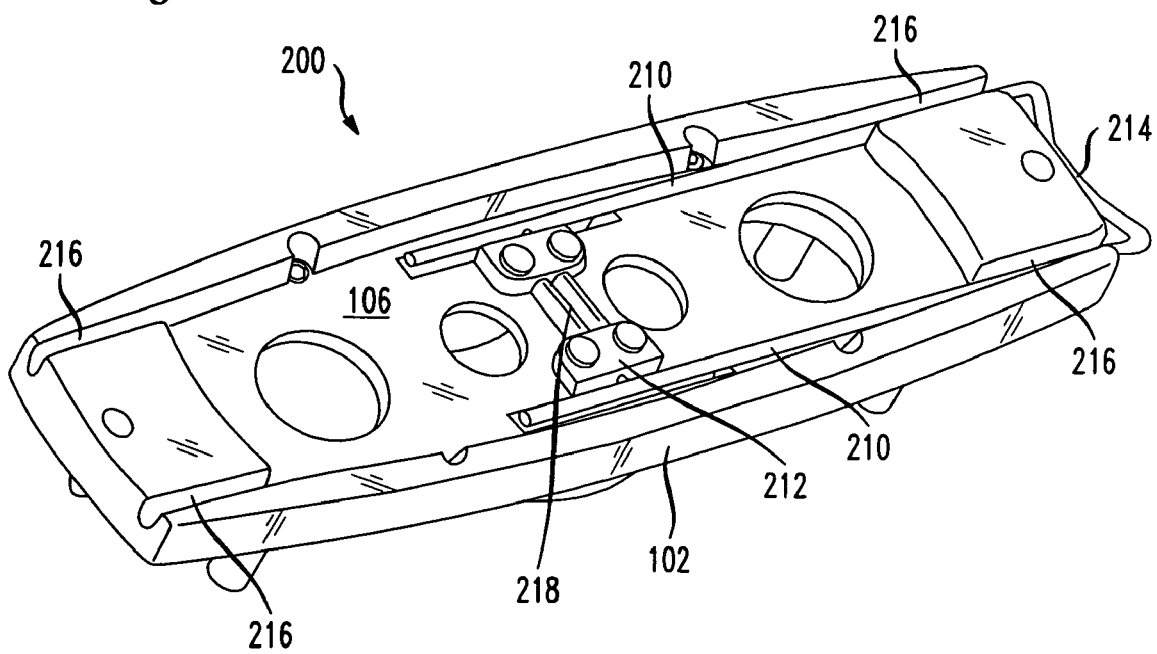
FIG. 2B depicts a bottom perspective view of an alternative sensing unit according to an embodiment of the present invention.

FIGS. 2A and 2B depict an alternative exemplary sensing unit 200 according to an embodiment of the present invention. FIG. 2A shows a bottom perspective view of the sensing unit 200 with an extended temperature bar 210 and FIG. 2B shows a bottom perspective view of the sensing unit 200 with a folded temperature bar 210. The sensing unit 200 may be similar to sensing unit 100 of FIGS. 1A and 1B and accordingly comprises similar components. For simplicity of presentation, only those components of sensing unit 200 that differ from sensing unit 100 are discussed in further detail. Substantially similar components of sensing unit 200 are referred to hereinafter and in FIGS. 2A and 2B by the same reference numerals.

In the embodiment depicted in FIGS. 2A and 2B, sensing unit 200 includes a temperature bar 210 protruding from the bottom surface 106. The temperature bar 210 may be coupled (e.g., attached) to the sensing unit 200 via a flexible or otherwise moveable, rotatable, and/or detachable connection 212 and may include a temperature detector 214. As shown in FIG. 2B, a portion of temperature bar 210 may be securable to the housing 102 at one or more catches 216 when the temperature bar 210 and/or the temperature detector 214 is not in use, when the sensing unit 200 is being transported, etc. Temperature bar 210 may additionally or alternatively be secured to the housing 102 at other locations along its length using other catches or any other appropriate securing means.

In the exemplary embodiment of FIGS. 2A and 2B, temperature bar 210 may be a rod, shaped wire, or substantially U-shaped bar of any appropriate length secured to the sensing unit 200 via flexible connection 212. In some embodiments, temperature bar 210 may be a 3 mm steel wire shaped into an approximately U-shaped configuration and including a crossbar 218 near the "open" end of the U-shaped wire. Temperature bar 210 may be secured to the housing 102 at the crossbar 218 such that a portion of the length of temperature bar 210 is free to pivot away from the housing 102 as shown in FIG. 2B. Of course, other configurations and materials may be used. For example, a temperature detector 214 may be secured between multiple temperature bars 210 moveably secured to sensing unit 200. FIGS. 1A, 1B, 2A, and 2B depict exemplary configurations of temperature bars, but any appropriate temperature sensing mechanism and/or means may be used in their stead.

Flexible connection 212 may be a spring, hinge, pivot, or other flexible and/or moveable apparatus to secure temperature bar 210 to the housing 102, but also to allow temperature bar 210 to be moved. In at least one embodiment, flexible connection 212 may include multiple components to secure the temperature bar 210. For example, a clasp, pin, bar, or other means for securing may be used to hold the crossbar 218 of FIGS. 2A and 2B to the bottom surface 106, but allow rotational movement of the crossbar 218; this allows the temperature bar 210 and temperature detector 214 to be capable of pivoting, but holding the temperature bar fast to sensing unit 200. In some cases, temperature bar 210 may be moved manually (e.g., secured by a user to catch 216). In other cases, temperature bar 210 may be moved in response to an obstacle. That is, in the course of operation, the temperature bar 210 and/or temperature detector 214 may contact an obstacle (e.g., a road surface, rock, debris, etc.) and the flexible connection 212 may allow the temperature bar 210 to move (e.g., swing and/or bend) out of the way of the obstacle without breaking off as in prior rigid extended temperature sensors. In some embodiments, temperature bar 210 may itself be flexible such that it is capable of bending, flexing, and/or moving as when encountering an obstacle or acted upon (e.g., pushed) by an outside force.

Temperature detector 214 may be a temperature sensor. Similarly, temperature bar 210 may be a temperature sensor and/or may be adapted to transmit temperature information from the temperature detector 214 to a controller 400 of FIG. 4 or other appropriate location as discussed above. In operation, the temperature detector 214 (or the temperature bar 210 if no temperature detector 214 is used) may measure a temperature near a surface and/or may measure one or more temperatures of air between the sensing unit 200 and a surface.

Figure 3:
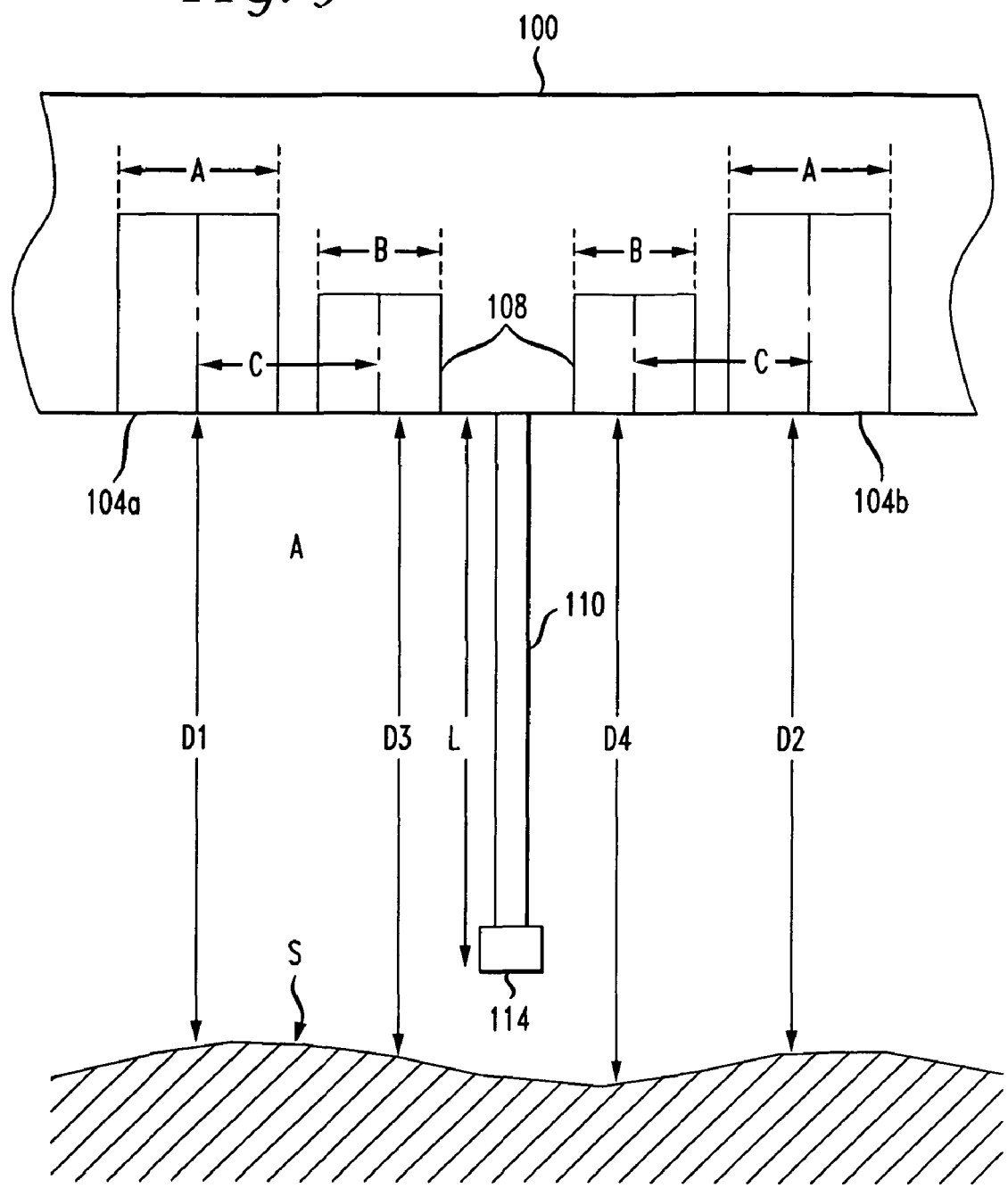
FIG. 3 depicts a side schematic view of a sensing unit according to an embodiment of the present invention.

FIG. 3 depicts a side schematic layout of the sensing unit 100 according to an embodiment of the present invention. Various diameters and frequencies of sensors may be used in operation of the sensing unit 100. FIG. 3 is presented as an illustrative embodiment to show the interaction of multiple sensors and is not meant to limit the invention to a single set of outer sensors 104a and 104b of a specific diameter or a single set of inner sensors 108a and 108b of a specific diameter.

In the exemplary embodiment of FIG. 3, outer sensors 104a and 104b may have a diameter A and a frequency $f_A$. In one embodiment, the diameter A may be substantially 25 mm and the frequency $f_A$ may be approximately 120 kHz. Similarly, inner sensors 108a and 108b may have a diameter B and a frequency $f_B$. In one embodiment, the diameter B may be substantially 16 mm and the frequency $f_B$ may be approximately 200 kHz. Each of sensors 104a and 104b and 108a and 108b may be separated by a center-to-center distance (e.g., approximately C). In practice, larger diameter sensors generate a wider radiation cone while smaller diameter sensors generate a narrower radiation cone. The distance C between sensors is preferably such that at the minimum advantageous reading distance L (discussed below) all radiation cones very slightly overlap. Though depicted here as pairs of sensors having equal diameters and frequencies, it may be understood that each sensor may have its own unique diameter and/or frequency. As discussed generally above, temperature bar 110 may be a length L, extending from the bottom surface 106.

In some embodiments, a controller 400 may be included and may be or may include any components or devices which are typically used by, or used in connection with, a computer or computer system. Such a controller may be control circuitry as described with respect to FIGS. 1A and 1B, reside at another location in the sensing unit 100, and/or be associated with (e.g., be in communication with and/or coupled to) the paving vehicle 602 discussed below with respect to FIG. 6.

Figure 4:
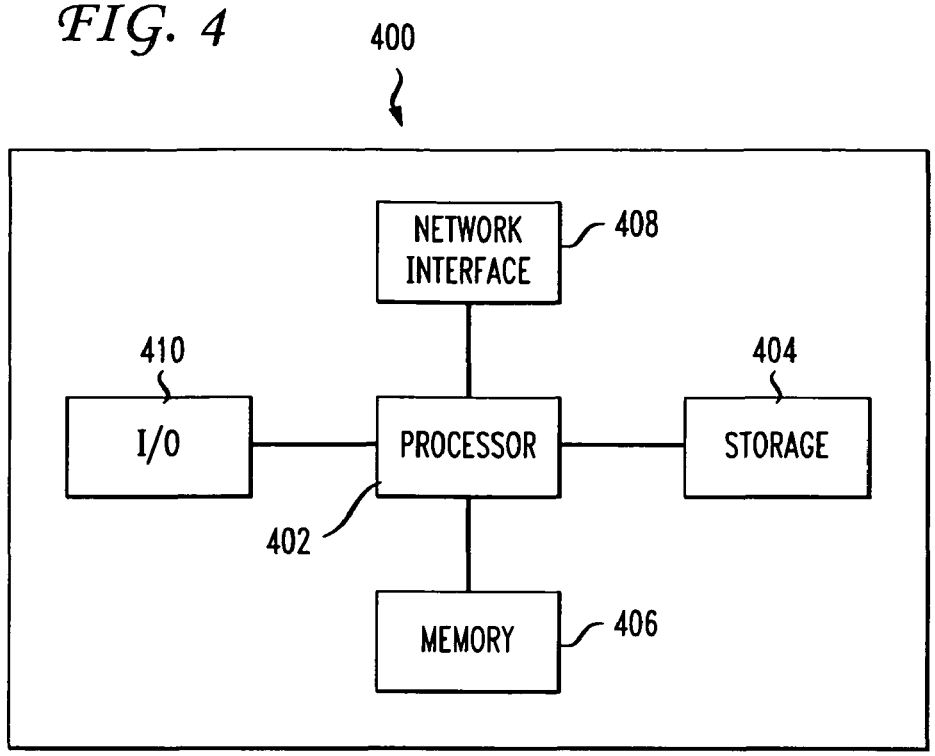
FIG. 4 is a high level block diagram of a controller according to an embodiment of the invention.

FIG. 4 is a schematic drawing of a controller 400 according to an embodiment of the invention. Controller 400 contains a processor 402 which controls the overall operation of the controller 400 by executing computer program instructions which define such operation. The computer program instructions may be stored in a storage device 404 (e.g., magnetic disk, database, etc.) and loaded into memory 406 when execution of the computer program instructions is desired. Thus, applications for performing the herein-described method steps, such as weighting measured distances (step 508 of method 500) and determining calculated distance (step 510 of method 500), are defined by the computer program instructions stored in the memory 406 and/or storage 404 and controlled by the processor 402 executing the computer program instructions. The controller 400 may also include one or more network interfaces 408 for communicating with other devices via a network (e.g., a Controller Area Network (CAN)). These devices may be other sensing units 100, 200, other controllers 400, or any other relevant device. The controller 400 also includes input/output devices 410 (e.g., display, keyboard, mouse, speakers, buttons, etc.) that enable user interaction with the controller 400. Controller 400 and/or processor 402 may include one or more central processing units, read only memory (ROM) devices and/or random access memory (RAM) devices. One skilled in the art will recognize that an implementation of an actual controller could contain other components as well, and that the controller of FIG. 4 is a high level representation of some of the components of such a controller for illustrative purposes.

According to some embodiments of the present invention, instructions of a program (e.g., controller software) may be read into memory 406, such as from a ROM device to a RAM device or from a LAN adapter to a RAM device. Execution of sequences of the instructions in the program may cause the controller 400 to perform one or more of the method steps described herein, such as those described below with respect to methods 500 and 700. In alternative embodiments, hardwired circuitry or integrated circuits may be used in place of, or in combination with, software instructions for implementation of the processes of the present invention. Thus, embodiments of the present invention are not limited to any specific combination of hardware, firmware, and/or software. The memory 406 may store the software for the controller 400, which may be adapted to execute the software program and thereby operate in accordance with the present invention and particularly in accordance with the methods described in detail below. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled and/or encrypted format. The programs furthermore may include program elements that may be generally useful, such as an operating system, a database management system and device drivers for allowing the controller to interface with computer peripheral devices, and other equipment/components. Appropriate general purpose program elements are known to those skilled in the art, and need not be described in detail herein.

Figure 5:
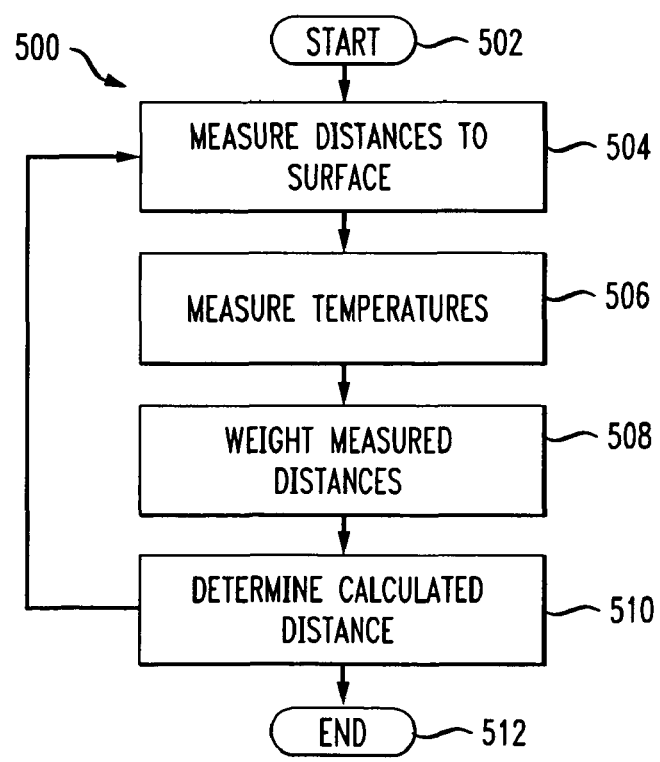
FIG. 5 illustrates a method of ultrasonic sensing.

In operation, sensing units 100, 200 may be used to determine a distance from the sensing unit 100, 200 to a surface S. FIG. 5 illustrates the method steps of a method 500 of ultrasonic sensing using the sensing unit 100, 200 and will be described in conjunction with FIG. 3. The method begins at step 502.

In step 504, distances to a surface are measured using sensors. For example, outer sensors 104a and 104b and inner sensors 108a and 108b each measure a respective distance D1, D2, D3, and D4 to a surface S as shown in FIG. 3. Specifically, sensor 104a measures distance D1, sensor 108a measures distance D2, sensor 108b measures distance D3, and sensor 104b measures distance D4.

In step 506, temperatures are measured. In some embodiments, a temperature may be measured by, for example, temperature bar 110, temperature detector 114, and/or temperature sensor 118. In such embodiments, the temperature may be a temperature in the vicinity of a work surface. Additionally and/or alternatively, temperatures may be measured in more than one location (e.g., at the work surface, midway between the work surface and sensing unit 100, and at sensing unit 100, etc.). In this way, temperature variations may be measured.

In step 508, the measured distances (e.g., D1-D4) are weighted. As is known, measurement devices (e.g., sensors) may be more or less accurate under certain conditions. In the context of the present invention, range sensors of a smaller diameter may be more accurate when close to a surface than range sensors of a larger diameter. Similarly, the larger diameter range sensors may be more accurate than the smaller diameter range sensors at a greater distance to the surface. Accordingly, it may be preferable to give more account to the sensors that are more likely to be more accurate at a certain distance. In this way, the input of multiple sensors may be used in determining the distance from the sensors to the surface while taking into account the likelihood that the inputs (e.g., measured distances) are accurate.

In some embodiments, the distances are weighted based on the distance from the sensors (e.g., sensors 104a, 104b, 108a, and 108b) to the surface S. This may be an approximate predetermined distance that may be input by a user, may be known at controller 300, and/or may be approximated based on the measured distances. That is, sensors 104a, 104b, 108a, and 108b may each measure a distance to the surface S and the approximate predetermined distance may be determined using these initial measurements.

In the same or alternative embodiments, when the surface S is greater than a distance L (e.g., the closest the sensing unit 100 can be to the surface S without impacting temperature bar 110 and/or temperature detector 114) and less than a maximum advantageous sensing distance of the inner sensors 108a and 108b, the distances measured by the inner sensors 108a and 108b (e.g., distances D3 and D4) are weighted by a factor of X (e.g., X(D3) and X(D4), X(D3+D4), etc.). In an alternative embodiment, each measured distance has its own weighting factor (e.g., $X_1$(D3), $X_2$(D4), etc.).

In practical application, the minimum sensing distance may be limited by the function of the chosen sensor and not the length L of the temperature bar 110. That is, the minimum sensing distance may be limited by the abilities of the sensors and the related electronics.

In the example described herein, inner sensors 108a and 108b have a diameter B of 16 mm and a frequency $f_B$ of 200 kHz and a minimum sensing distance (e.g., the minimum distance at which an acceptably stable reading may be achieved) of approximately 20 cm and a maximum advantageous sensing distance of approximately 40 cm. When the surface S is further away than the maximum advantageous sensing distance of the inner sensors 108a and 108b (e.g., approximately 40 cm), the distances measured by the outer sensors 104a and 104b (e.g., distances D1 and D2) are weighted by a factor of Y (e.g. Y(D1) and Y(D2), Y(D1+D2), etc.). In an alternative embodiment, each measured distance has its own weighting factor (e.g., $Y_1$(D1), $Y_2$(D2), etc.). Of course, other inner sensors, 108a and 108b and/or outer sensors 104a and 104b with different respective diameters A and B and/or frequencies $f_A$ and $f_B$ may be used. In such cases, different minimum sensing distances and maximum advantageous sensing distance may be used.

In an exemplary embodiment, when sensing unit 100 is relatively far from the surface (e.g., greater than approximately 50 cm), the distances measured by the outer sensors 104a and 104b (e.g., distances D1 and D2) are each weighted by a factor of 50% and the distances measured by the inner sensors 108a and 108b (e.g., distances D3 and D4) are each weighted by a factor of 0%. Similarly, when the sensing unit 100 is relatively close to the surface (e.g., less than approximately 25 cm), the distances measured by the inner sensors 108a and 108b (e.g., distances D3 and D4) are each weighted by a factor of 50% and the distances measured by the outer sensors 104a and 104b (e.g., distances D1 and D2) are each weighted by a factor of 0%. When the sensing unit 100 is positioned at intermediate distances (e.g., between approximately 25 cm and approximately 50 cm), the relative weights for each sensor varies linearly with the distance from the surface. Of course, other variation gradients and/or weights may be used for various distances from the surface.

Measured distances D1-D4 may be weighted based at least in part on a measured temperature. That is, an additional weighting factor may applied to one or more of the measured distances to account for variations in temperature between the sensing unit 100 in the region of the sensors 104a, 104b, 108a, and 108b and the surface S. Since each sensor may be affected differently by variations in temperature, each sensor may have its own weighting factor. Similarly, equal weighting factors may applied to similar sensors (e.g., the same weighting factor for sensors 104a and 104b and a different weighting factor for sensors 108a and 108b, etc.).

In step 510, a calculated distance is determined. In some embodiments, a weighted average distance is calculated. The weighted measured distances may be averaged to determine an approximate calculated distance (ACD). Thus, in the above example:

$$ACD = \begin{cases} \dfrac{X(D_3 + D_4) + (D_1 + D_2)}{4}, & \text{if } L < \text{estimated } ACD < 40\,\text{cm} \\ \dfrac{Y(D_1 + D_2) + (D_3 + D_4)}{4}, & \text{if estimated } ACD > 40\,\text{cm} \end{cases}$$

It is understood that the weighting factors X and Y may be the same, may be of any value (e.g., 0, 0.5, 1, 2, etc.), and/or may be predetermined and/or continually re-determined. If more or less sensors are used, different and/or additional weighting factors may be used. Similarly, a weighting factor based on the one or more measured temperatures may also be used in the calculation of the distance to the surface.

Following step 510, the method 500 may return control to step 504. That is, a new distance may be measured by one or more sensors to be used in calculation of a weighted average distance (e.g., ACD). This method may be repeated continually in real-time to provide a constant updated of the distance to the surface for use in construction operations.

In step 512, the method 500 ends.

FIG. 6 depicts a top schematic view of a paving system 600 for distance and/or temperature sensing according to an embodiment of the present invention. The system 600 comprises a paving vehicle 602. Paving vehicle 602 may be a construction vehicle for use in road paving and/or construction or may be any other type of movable and/or stationary platform. Coupled to paving vehicle 602 may be one or more sensing units 100 as described above. FIG. 6 also shows a first lane of road 604, a second lane of road 606, and the joint 608 between them. In operation, the paving vehicle 602 may be used in ultrasonic distance sensing, temperature measurement, and/or related construction tasks such as road paving.

For illustrative purposes, FIG. 7 illustrates the method steps of a method 700 of paving. The method begins at step 702.

In step 704, the paving vehicle 602 paves a first section of road (e.g., first lane 604). In some embodiments, the paving vehicle 602 paves a lane of road at a time. When laying asphalt (e.g., paving) on a first lane 604, the joint 608 of asphalt exposed to a future second lane 606 (e.g., the section to be asphalted) may cool. This may prevent the second lane 606 from properly bonding with the first lane 604.

In step 706, a temperature of a road surface is measured. In some embodiments, the temperature bar 110, temperature detector 114, and/or temperature sensor 118 will measure the temperature of the asphalt on the first lane 604. Any of these or other sensors may be used to measure such a temperature as appropriate.

In step 708, the suitability of the measured temperature for paving operation is determined. If the road surface is an unsuitable temperature, an alarm condition is triggered in step 710. In step 712 corrective action is taken. In at least one embodiment, the alarm condition may comprise an indication to heat the joint 608 (e.g., the corrective action of step 712) using an appropriate method or may be transmitted to a user by controller 400 (e.g. via input/output device 410). After corrective action is taken, the method passes to step 706 to re-measure the surface temperature and/or to step 714. If the road surface temperature is measured as a suitable temperature, the method passes control to step 714.

In step 714, a second section of road (e.g., second lane 606) is paved by the paving vehicle 602. The method ends at step 716.

The foregoing description discloses only particular embodiments of the invention; modifications of the above disclosed methods and apparatus which fall within the scope of the invention will be readily apparent to those of ordinary skill in the art. For instance, it will be understood that, though discussed primarily as a stand-alone unit with one set of inside sensors and one set of outside sensors, any number and/or type of sensors in any suitable arrangement may be used with a corresponding weighting and/or calculating algorithm. Similarly, other components may perform the functions of methods 500 and 700 even when not explicitly discussed.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A range sensing apparatus for determining a distance from the range sensing apparatus to a surface comprising:
   a first ultrasonic range sensor having a first size;
   a second ultrasonic range sensor having a second size different from the first size; and
   a controller configured to calculate the distance based at least in part on ranges measured with the first and second ultrasonic range sensors.

2. The range sensing apparatus of claim 1 further comprising:
   a housing;
   a flexible connection attached to the housing;
   a bar attached to the flexible connection at a first end;
   a temperature detector attached to the bar at a second end of the bar; and wherein the controller is further configured to receive temperature information from the temperature sensor.

3. The range sensing apparatus of claim 1 further comprising:
a temperature sensor coupled to the range sensing apparatus.

4. The range sensing apparatus of claim 1 further comprising:
a third ultrasonic range sensor having the first size;
a fourth ultrasonic range sensor having the second size; and
wherein the controller is further configured to calculate the distance based at least in part on ranges measured with the first, second, third, and fourth ultrasonic range sensors.

5. The range sensing apparatus of claim 4 wherein the first and third ultrasonic range sensors have a diameter that is smaller and a frequency that is higher than the diameter and frequency of the second and fourth ultrasonic range sensors.

6. The range sensing apparatus of claim 5 wherein the second and fourth ultrasonic range sensors are arranged outboard of the first and third ultrasonic range sensors on a surface of the range sensing apparatus.

7. The range sensing apparatus of claim 1 wherein the size of the first ultrasonic range sensor is a first diameter and the size of the second ultrasonic range sensor is a second diameter.

8. A range sensing apparatus for determining a distance from the range sensing apparatus to a surface comprising:
a first pair of ultrasonic range sensors having a first size and a first frequency;
a second pair of ultrasonic range sensors having a second size different from the first size and a second frequency different from the first frequency; and
a controller configured to calculate the distance based at least in part on ranges measured with the first and second pairs of ultrasonic range sensors.

9. The range sensing apparatus of claim 8 further comprising:
a housing;
a flexible connection attached to the housing;
a bar attached to the flexible connection at a first end;
a temperature detector attached to the bar at a second end of the bar; and
wherein the controller is further configured to receive temperature information from the temperature sensor.

10. The range sensing apparatus of claim 8 further comprising:
a temperature sensor coupled to the range sensing apparatus.

11. The range sensing apparatus of claim 8 wherein the second pair of ultrasonic range sensors have a diameter that is smaller and a frequency that is higher than the diameter and frequency of the first pair of ultrasonic range sensors.

12. The range sensing apparatus of claim 11 wherein the first pair of ultrasonic range sensors are arranged outboard of the second pair of ultrasonic range sensors on a surface of the range sensing apparatus.

13. The range sensing apparatus of claim 8 wherein the size of the first pair of ultrasonic range sensors is a first diameter and the size of the second pair of ultrasonic range sensors is a second diameter.

14. A method of determining a distance from a range sensing apparatus to a surface comprising:
measuring a first set of distances from the range sensing apparatus to the surface with a first set of sensors having a first size;
measuring a second set of distances from the range sensing apparatus to the surface with a second set of sensors having a second size different from the first size; and
calculating a calculated distance from the range sensing apparatus to the surface based at least in part on the measured first and second sets of distances.

15. The method of claim 14 wherein the first and second sets of sensors each comprise one sensor.

16. The method of claim 14 wherein the first and second sets of sensors each comprise two sensors.

17. The method of claim 14 further comprising:
weighting the measured first set of distances with a first weight;
weighting the measured second set of distances with a second weight; and
calculating the calculated distance based at least in part on the weighted measured distances.

18. The method of claim 17 further comprising:
measuring a temperature of the surface; and
weighting the measured distances based at least in part on the measured temperature.

19. The method of claim 17 wherein calculating the calculated distance based at least in part on the weighted measured distances comprises calculating a weighted average of the first and second sets of measured distances.

20. The method of claim 14 wherein:
the range sensing apparatuses are ultrasonic range sensors and the first and second sizes are first and second diameters.

21. An apparatus for measuring a temperature of a road surface comprising:
a housing;
a flexible connection attached to the housing;
a temperature sensor coupled to the flexible connection;
a first ultrasonic range sensor having a first size;
a second ultrasonic range sensor having a second size different from the first size; and
a controller configured to calculate a distance from the apparatus to the road surface based at least in part on ranges measured with the first and second ultrasonic range sensors.

* * * * *